United States Patent [19]

Maddalena

[11] 4,399,931

[45] Aug. 23, 1983

[54] DRY MATERIAL DISPENSER

[76] Inventor: Richard E. Maddalena, 139 Lakeville St., Petaluma, Calif. 94952

[21] Appl. No.: 247,102

[22] Filed: Mar. 24, 1981

[51] Int. Cl.³ ............................................. G01F 11/00
[52] U.S. Cl. .................................. 222/282; 222/409; 222/564
[58] Field of Search ............... 222/282, 409, 283, 291, 222/564

[56] References Cited

U.S. PATENT DOCUMENTS

| 683,157 | 9/1901 | Trimble | 222/409 |
| 739,228 | 9/1903 | Schutz | 222/409 |
| 3,001,410 | 9/1961 | Letson | 222/409 |

Primary Examiner—H. Grant Skaggs
Attorney, Agent, or Firm—Melvin R. Stidham

[57] ABSTRACT

A dry matter dispensing device comprising a hopper having a paddle pivoted between the front and rear walls, the paddle is oscillated to sweep the contents from the opposite ends of an arcuate, concave tray with each stroke thereof. The dry material slides down a pair of adjustably sloped panels on opposite sides of that paddle so that, as the paddle sweeps material in front of it on each stroke, more is dropping down the sloped panel behind it to pile up on the concave tray. Hence, a measured amount of the dry material is delivered by setting the length and number of paddle strokes. The adjustment of the sloping panels is made to ensure free flow to the concave tray without the material bridging or escaping prematurely from the tray.

3 Claims, 3 Drawing Figures

DRY MATERIAL DISPENSER

BACKGROUND OF THE INVENTION

There are many operations in agriculture and industry that require the dispensing of measured quantities of dry material. For Example, in modern dairy farming and the like, it is recognized that individual animals of a herd often require special diets and dietary supplements and that it is not feasible to feed the herd en masse, with each animal determining its own intake. Some efforts are being made to supply individual animals with approximate food quantities. However, it is highly desirable to monitor the animals feed very closely and to maintain a close surveillance so that results can be determined and evaluated.

OBJECTS OF THE INVENTION

It is an object of this invention to provide a dry material distributing device that can deliver precise, selected quantities without complicated adjustment.

It is a further object of this invention to provide a dispensing device that can deliver in fairly rapid succession different precise quantities of dry material.

Other objects and advantages of this invention will become apparent from the description to follow, particularly when read in conjunction with the accompanying drawings.

SUMMARY OF THE INVENTION

In carrying out this invention, I provide a hopper which can be filled from the top with particles of a dry material. Fixed near the bottom of the hopper is an arcuate, concave tray. Pivoted above the tray is a paddle which sweeps contents of the tray out of the hopper, successively from opposite ends of the tray. Particles in the hopper drop to a delivery opening in which a pair of adjustably sloping panels is disposed, each hinged on an axis slightly above and parallel to the axis of the paddle. The space between the sloping panels, which is adjusted according to the nature of the material, is traversed by the paddle as it oscillates. That is, the spaces provided for free-pouring, granular materials are narrow, while those for materials which tend to cluster or clot are wide. As a paddle oscillates, the material falls behind it onto the arcuate tray, so that on return stroke the paddle sweeps the quantity so deposited off the opposite end as another like quantity of material falls behind it on that side. Hence, during each stroke a measured amount is swept from the arcuate tray, and the total amount of material delivered at the discharge opening is dependent upon the length and number of strokes. For measuring animal feed, each animal could be identified and a signal given to oscillate the paddle a predetermined number of strokes, whereby a precisely measured quantity of feed will be delivered at the discharge opening.

DESCRIPTION OF A PREFERRED EMBODIMENT

Figure 1:
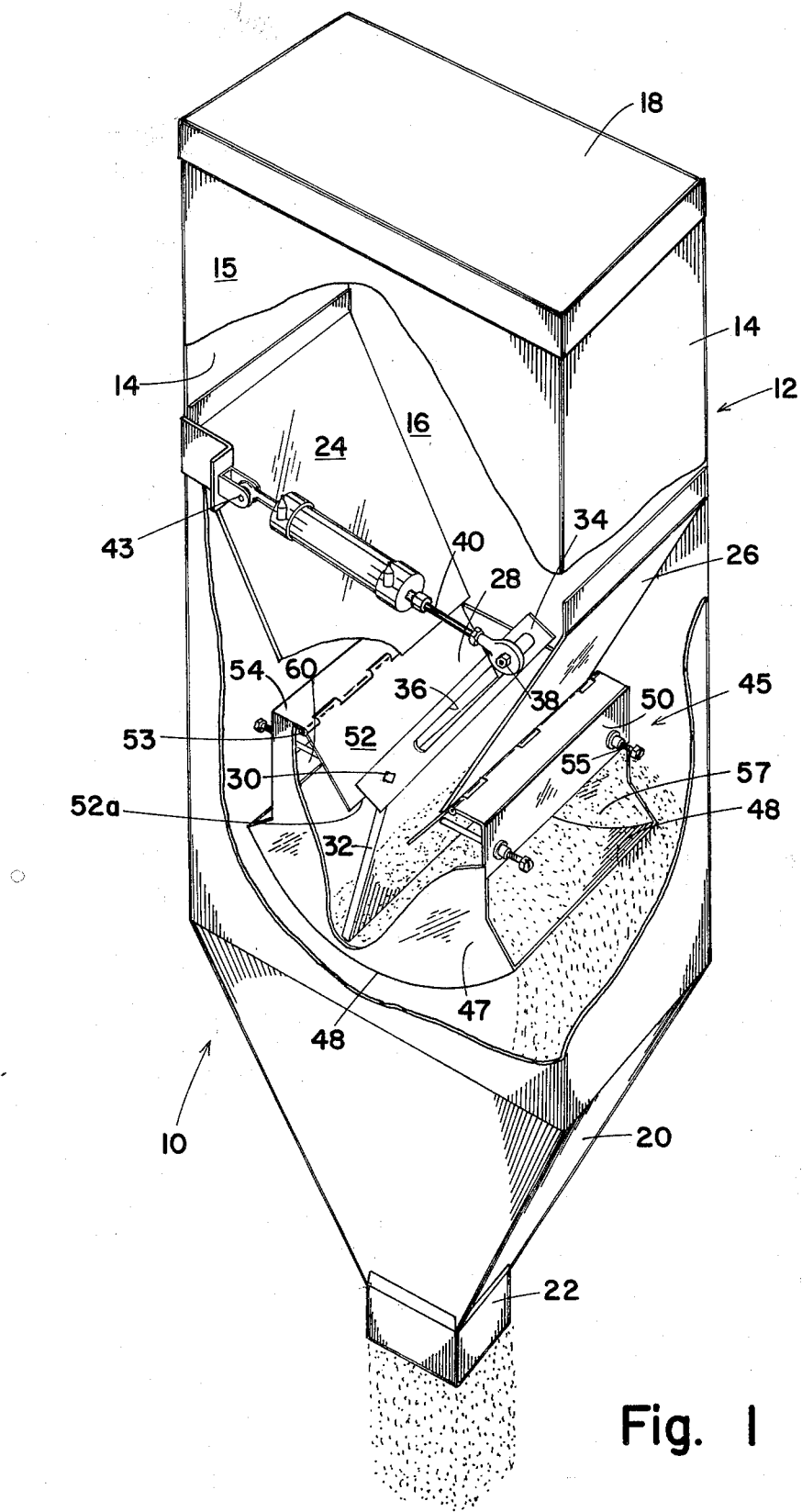
FIG. 1 is a view in perspective, partially broken away, of the dry material dispensing device of this invention.

Referring now to the drawings with greater particularity, the dry material dispenser 10 of this invention includes a hopper 12, which may be of generally rectangular cross section with side walls 14 and front and rear walls 15 and 16. The hopper 12 may be provided with a removable lid 18, and may have at its lower end, a chute 20 having tapering walls which converge toward a discharge piece 22 through which a measured amount of the hopper contents may be discharged into a suitable container (not shown).

Converging downward from inside of the side walls 14 are sloping upper chute walls 24 and 26 which allow particles of a dry material, such as cattle feed, to be directed by gravity to a central feed opening 28 above the delivery chute 20.

Figure 3:
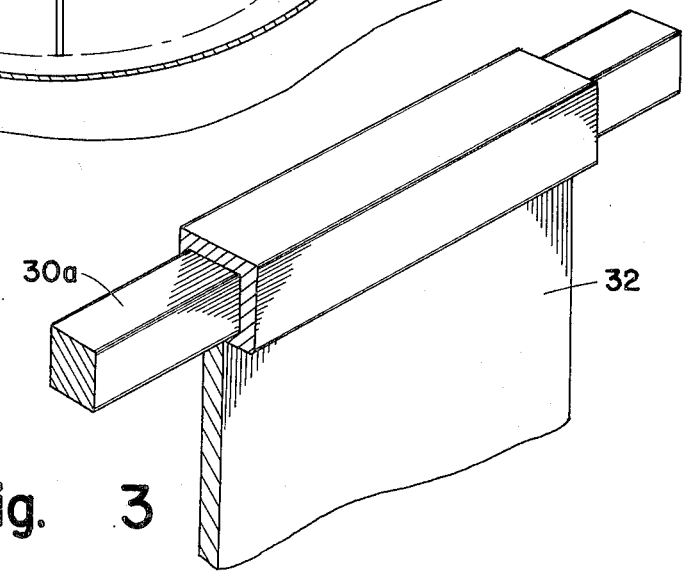
FIG. 3 is a partial view in perspective showing the paddle mounting.

Pivotally mounted between the front and rear walls 15 and 16 is a paddle 32 which oscillates across the central feed opening 28, driven by an arm 34 which is fixed to the shaft 30 as by mounting it on a square portion 30a thereof (FIG. 3). A slot 36 in the arm 34 receives a bolt 38 carried on the end of a reciprocable rod 40 which may be reciprocated by a solenoid or a pneumatic cylinder 42, either of which may be pivotally mounted at 43 on the hopper 12.

The dispensing unit 45, which has full front and rear walls 47 with arcuate lower edges supporting a concave tray 48, and partial end walls 50 is secured into the hopper 12 to underlie the sloping baffles 24 and 26. Each of a pair of sloping panels 52 is hinged at 53 to one of the short top panels 54, and the slope of each is adjusted by screw means 55. The paddle shaft 30 is journaled in the walls 47 between, and somewhat below, the axes of the hinge pins 53. The paddle oscillates between the edges 52a of the adjustable ramps 52, and the slope of each ramp 52 is adjusted in accordance with the nature of the material to be dispensed. Hence, the slope is lessened to reduce the pouring space between the edges 52a of the ramp 52 and the surfaces of the paddle 32 in the case of free pouring granular material. This is to prevent excessive pouring, bridging and premature dispersion from the openings 57 below the short end walls 50 of the dispensing unit 45. On the other hand, with materials that tend to cluster or consolidate, the space must be made large enough that it will not be bridged and clogged by the material.

Figure 2:
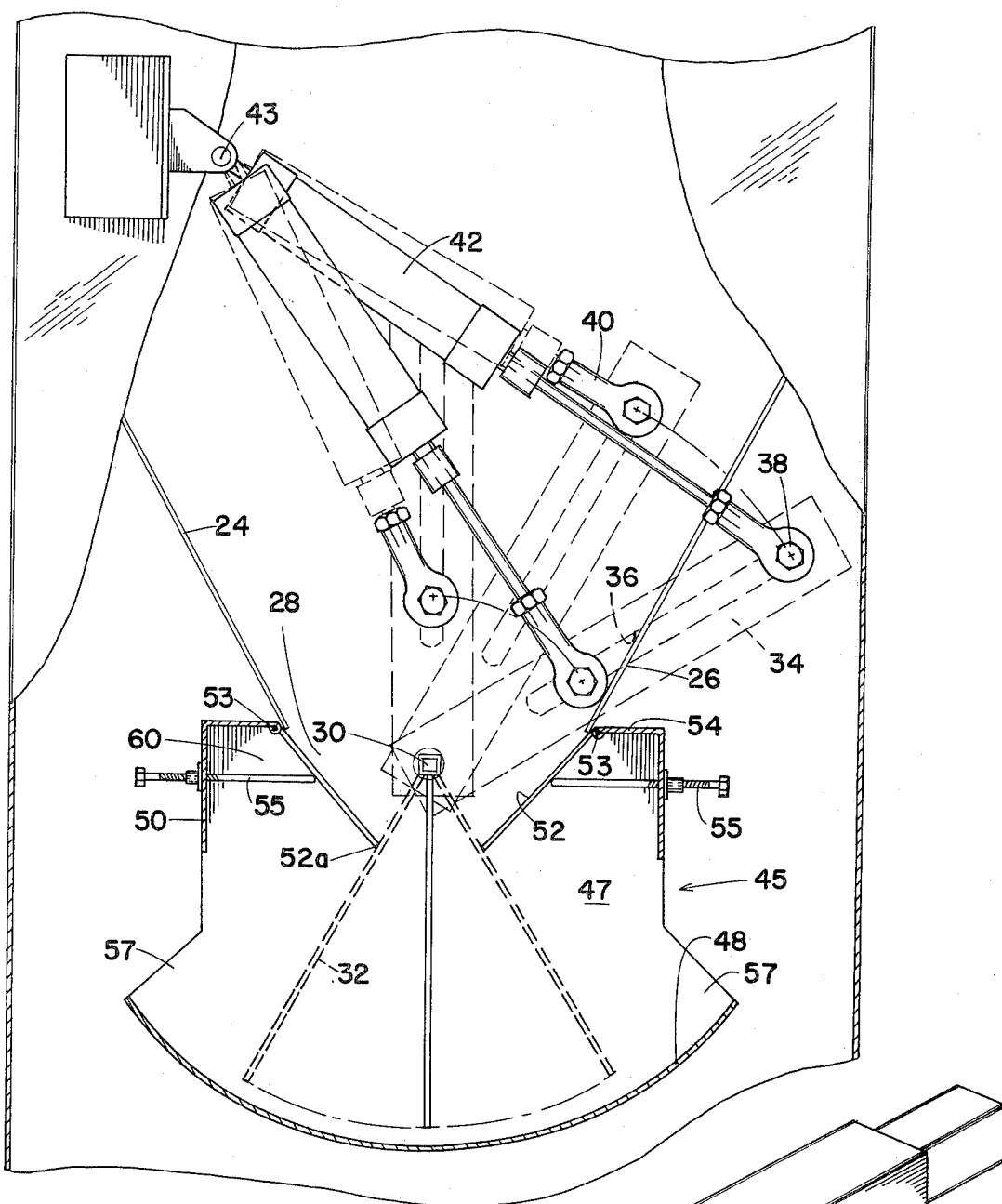
FIG. 2 is a partial front view showing the operation of the paddle distributor.

Referring now more particularly to FIG. 2, the paddle 32 normally starts in a position in engagement with the lower edge 52a of one of the adjustable ramps 52. The paddle is adjacent the edge 52a of one ramp, particles in the hopper 12 are free to drop down the opposite ramp 26 and into the arcuate, concave delivery tray 48 at the bottom of the dispenser unit 45. Restraining walls 50 prevent the feed from overflowing as it piles up.

In operation, with the paddle 32 positioned in engagement with the edge 52a of the left ramp 52, the arcuate, concave tray 52 will be filled on the righthand side of the paddle 32 as distribution begins. Then, the paddle 32 is oscillated through a predetermined number of strokes by extension and retraction of the piston rod 40 in cylinder 42. As the paddle pivots to the right, in FIG. 2 it sweeps the dry material from the concave tray 48 out through the discharge opening 57 into the chute 20 below until the paddle reaches the end of its stroke at or near engagement with the edge 52a of the opposite rams 52. During this time, particles are dropping down the opposite ramp 52 to the left hand side of the paddle 32 so that there is a measured quantity to be swept by the paddle 32 on its return stroke. Because some dry materials tend to bridge and form a mass, the ramps 52 are hinged so that the spaces between the paddle 32 and the ramps 52 may be adjusted, as previously described. In addition, spaces 60 are provided behind the ramps 52 to accommodate any excessive material which is so matted.

For any given material, the piston arm 40 may be adjusted along the slot 36 of arm 34 to adjust the amount of material dispensed during each stroke. Hence, when feeding animals, the number of strokes per feeding may be fed into a controller (not shown) so that the piston rod 40 will deliver the number of strokes to give the prescribed feeding amount.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. A dry material dispensing device comprising:
   a hopper;
   a paddle pivotable in said hopper on a horizontal axis;
   an arcuate concave tray disposed beneath said paddle and coaxial therewith;
   means for oscillating said paddle to sweep contents of said tray alternately from opposite ends thereof;
   sloping delivery panels in said hopper having outer edges above and parallel to the axis of said paddle said panels converging to a delivery opening between their opposing inner edges below said horizontal axis which is transversed by said paddle during oscillation;
   said opposing inner edges being engagable by the sides of said paddle;
   hinge means along said outer edges of said delivery panels pivotally mounting said panels in said hopper; and
   adjustable stop members on said hopper engagable with the backs of said delivery panels to adjust the slope thereof and to limit the oscillation of said paddle.

2. The feed measuring device defined by claim 1 including:
   means for adjusting the oscillatory stroke of said paddle.

3. The feed measuring device defined by claim 1 wherein said oscillating means comprises:
   an arm on said paddle;
   a reciprocable rod for oscillating said arm; and
   a slot in said arm so that the point of connection with said rod can be adjusted.

* * * * *